US011758231B2

(12) United States Patent
Laverty

(10) Patent No.: US 11,758,231 B2
(45) Date of Patent: Sep. 12, 2023

(54) SYSTEM AND METHOD OF REAL-TIME ACCESS TO RULES-RELATED CONTENT IN A TRAINING AND SUPPORT SYSTEM FOR SPORTS OFFICIATING WITHIN A MOBILE COMPUTING ENVIRONMENT

(71) Applicant: Michael J. Laverty, Newbury Park, CA (US)

(72) Inventor: Michael J. Laverty, Newbury Park, CA (US)

(*) Notice: Subject to any disclaimer, the term of this patent is extended or adjusted under 35 U.S.C. 154(b) by 291 days.

(21) Appl. No.: 17/027,579

(22) Filed: Sep. 21, 2020

(65) Prior Publication Data
US 2021/0089778 A1    Mar. 25, 2021

Related U.S. Application Data

(60) Provisional application No. 62/902,903, filed on Sep. 19, 2019.

(51) Int. Cl.
*H04N 21/472* (2011.01)
*H04N 21/4415* (2011.01)
*G06F 16/438* (2019.01)
*G06F 16/45* (2019.01)
*G06F 16/435* (2019.01)
*G06V 20/40* (2022.01)
*G06F 18/214* (2023.01)
*G06V 10/82* (2022.01)

(52) U.S. Cl.
CPC ..... *H04N 21/47202* (2013.01); *G06F 16/437* (2019.01); *G06F 16/438* (2019.01); *G06F 16/45* (2019.01); *G06F 18/214* (2023.01); *G06V 10/82* (2022.01); *G06V 20/42* (2022.01); *H04N 21/4415* (2013.01)

(58) Field of Classification Search
None
See application file for complete search history.

(56) References Cited

U.S. PATENT DOCUMENTS

| 2004/0152055 A1* | 8/2004 | Gliessner | G09B 19/04 434/156 |
| 2014/0087349 A1* | 3/2014 | Kitch | G09B 5/06 434/308 |

(Continued)

*Primary Examiner* — Ricky Chin
(74) *Attorney, Agent, or Firm* — LAZARIS IP

(57) ABSTRACT

A tool and associated data processing framework is disclosed for delivering supporting content to users, in response to voice-based and touch-based interactions with a mobile computing device, for sports officials and other authorities during training or while encountering situations where governing rules, policies, protocols or other procedures are applicable. The tool is accessible via one or more applications resident on mobile computing devices, and enables a real-time response to requests for information in an interpretation of a rule, or in an explanation of how to handle a particular a situation, that are communicated via such voice-based or touch-based interactions. The tool delivers audio and/or video files, a summarization or lay explanation representing the desired interpretation of the rule or the desired response to the situation, and an official version of the rule being interpreted, or an official response to the situation, via a user interface or other display on the mobile computing device.

22 Claims, 2 Drawing Sheets

(56) References Cited

U.S. PATENT DOCUMENTS

| | | | |
|---|---|---|---|
| 2014/0156279 A1* | 6/2014 | Okamoto | H04M 3/4938 |
| | | | 704/257 |
| 2014/0250147 A1* | 9/2014 | Shapira | G06Q 10/02 |
| | | | 707/770 |
| 2016/0048561 A1* | 2/2016 | Jones | G06F 16/285 |
| | | | 707/722 |
| 2017/0178531 A1* | 6/2017 | Swank | G06F 21/31 |
| 2018/0101576 A1* | 4/2018 | Lin | H04L 67/306 |
| 2018/0204476 A1* | 7/2018 | Laverty | G09B 5/06 |
| 2018/0369038 A1* | 12/2018 | Bhimavarapu | A61G 7/10 |
| 2019/0318728 A1* | 10/2019 | Sherman | G06F 3/0488 |
| 2019/0384762 A1* | 12/2019 | Hill | G06F 16/9535 |
| 2020/0233897 A1* | 7/2020 | Hite | F24C 7/086 |
| 2020/0258517 A1* | 8/2020 | Park | H04N 21/47214 |
| 2020/0388076 A1* | 12/2020 | Kosaka | G06F 40/186 |
| 2021/0089778 A1* | 3/2021 | Laverty | G06K 9/6256 |
| 2021/0125025 A1* | 4/2021 | Kuo | H04L 65/1069 |
| 2021/0149937 A1* | 5/2021 | Coulombe | G06F 16/3334 |

* cited by examiner

SYSTEM AND METHOD OF REAL-TIME ACCESS TO RULES-RELATED CONTENT IN A TRAINING AND SUPPORT SYSTEM FOR SPORTS OFFICIATING WITHIN A MOBILE COMPUTING ENVIRONMENT

CROSS-REFERENCE TO RELATED PATENT APPLICATION(S)

This patent application claims priority to U.S. provisional application 62/902,903, filed on Sep. 19, 2019, the contents of which are incorporated in their entirety herein. In accordance with 37 C.F.R. § 1.76, a claim of priority is included in an Application Data Sheet filed concurrently herewith.

FIELD OF THE INVENTION

The present invention relates to the field of mobile computing and data processing, and provides an approach for accessing training and support materials for sports officials and other authorities within an application resident, or accessed from, a mobile computing device. Specifically, the present invention relates to a system and method for processing real-time textual and video requests for, and enabling responsive references to, rules-related content within an online tool which can be accessed and applied using a mobile computing environment.

BACKGROUND OF THE INVENTION'

Mobile computing has become a ubiquitous and necessary element of modern life, and mobile devices are used every day to access information for countless uses, such as for reference and learning. In a mobile computing environment, such information is typically accessed using elements such as an application or "app" that is resident on, or accessed from, an Internet-enabled mobile telephone or other computing device.

In the world of sports, existing approaches to training of and providing support for referees and officials typically evolve at the professional level, and then percolate down to coaches at the lower amateur and/or youth levels. This has also been the case for approaches applied to the training of players, particularly in youth sports, yet all sports are far more complicated for the sports official than they are for the participant due to the varied number of situations that require officiating knowledge coupled with a decisive response.

While there have been major advancements in training science for youth athletes, officiating has not kept pace; officials themselves still train in a very old-fashioned manner that has changed little over time. Prospective officials in youth sports typically attend a 1- or 2-day mechanics clinic, followed by a few rules clinics, and then go out and officiate actual contests. There is typically no further training until the following season is about to begin.

Additionally, and despite the proliferation of Internet-enabled mobile computing devices, there is no mechanism with which officials can access training and supporting content in real-time and using mobile devices, for example for quick reference while on a playing field or near a playing field. Such a mechanism would be useful for delivering content for clarification purposes for example, where an official needs immediate access to an explanation of a rule 'in the moment'. This is particularly relevant in a world where such mobile computing devices have become the primary point of information gathering and dissemination, and where many people often carry multiple computing devices with them at all times.

Still further, there are few mechanisms with which officials and other relevant users can access rules, policies or protocols in other, non-athletic fields of interest, such as for example in health care, law enforcement, education, and military situations, and regardless of whether such information is accessed for training purposes or to address or respond to issues actually experienced. For example, there are few mechanisms available to health care professionals to treat individuals in a pandemic situation and comply with rules, policies and protocols set forth by various entities, all of which may change frequently, and at the same time provide observations experienced during the course of treatment.

Accordingly there is a need in the existing art for an approach that leverages a delivery mechanism such as a mobile computing device for training and supporting officials in both youth and professional sports, as well as other fields of endeavor, that can provide content in response to commands from a user in or near real-time. There is also a need for approach that incorporates technological tools such as applications resident on, or accessible from, Internet-enabled mobile computing devices, and that allows for a seamless integration of these technological tools to disseminate information and content in real-time or as needed. There is still a further need in the existing art for an approach that leverages a delivery mechanism such as a mobile computing device for training and supporting relevant users dealing with particular, non-sporting fields, such as for example in emergency response situations where compliance with rules, policies and protocols are important, in response to commands in or near real-time.

BRIEF SUMMARY OF THE INVENTION

The present invention provides a tool for reference and learning within a mobile computing environment, and a framework for processing data within such a tool. The tool is particularly useful for training and supporting individuals involved in sports refereeing and officiating, and may also be extended to other areas where application of rules, policy or protocols is necessary such as for example law enforcement, health care, security, emergency response, education, and military training and support situations, and many others.

The present invention provides an approach that advances upon existing systems and methods in a manner that provides a user with the ability to access and digest learning, training, support, or reference material as needed and/or in or near real-time, to realize improvements in the realm of sport officiating and other fields of endeavor. This approach responds to a user's voice, touch, or other commands to access relevant topics from within each sport's set of rules, to provide a quick reference to rules-related content in multiple delivery formats, and promote improvements in reading the field-of-play while in a contest is in progress and correctly applying an appropriate rule in real-time situations.

The present invention responds to voice, touch, or other commands from users by processing the incoming request to discern the user's intent, to perform a variety of actions within a system for cognitive assimilation and situational recognition that represents a broader tool for learning techniques in sports officiating, and for supporting officials in real time. For example, the present invention may respond to such voice, touch, or other commands by downloading a short audio and/or video link or links that represent that content the user wishes to learn, understand, or receive support or clarification for. The present invention may also present a summarization of a rule for which interpretation is needed by the user, and an explanation of that rule in "plain English" or lay terms, as well as the penalty, if any, where the rule has been violated. The present invention may further provide the entire rule or an official (or more formal) statement of the rule, in addition to the summarization and more simplistic explanation. The present invention may further provide an instruction for the user as to how to proceed given a particular situation encountered. All of this is accomplished from a user's personal mobile computing device, such as a mobile "smart" telephone, a "smart" watch, a tablet, or a laptop computer, using one or more mobile applications that reside on such devices, or are accessible from such devices.

The present invention is therefore a system and method for locating and accessing content within an approach for cognitive assimilation and situational recognition in a web-based mobile computing environment. The system and method is provided via a mobile application or applications that provide access to content presented in different formats for enabling a recipient of content to quickly interpret and apply a rule, and to improve situational accuracy in real time or as needed by the user, by responding to voice, touch, or other commands for specific information.

It is therefore one objective of the present invention to provide a tool for supporting sports officials in a mobile computing environment. It is another objective of the present invention to provide a system and method for supporting sports officials that is responsive to voice or touch commands for accessing particular content in a web-based environment that is accessible using mobile computing devices. It is a further objective of the present invention to provide a system and method of training and support in any field where situational recognition and/or real-time rules, policies, protocols, or procedures interpretation is beneficial, using such voice/touch responsiveness with web-based, mobile access.

Other objects, embodiments, features, and advantages of the present invention and its embodiments will become apparent from the following description of the embodiments, taken together with the accompanying drawings, which illustrate, by way of example, principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

The present invention is a mobile computing platform and tool 100 for promoting improvements in accuracy of rules interpretation and application, and situational response, in one or more systems and methods that are provided in an online environment. The mobile computing platform and tool 100 may be utilized in many different fields, for example for training and supporting sports officials such as referees and umpires, and may also be applicable in other areas such as law enforcement, military, security, organizational safety and threat response (for example, in active shooter situations), education, maritime, aviation, and health care situations such as assisting emergency/first responders and other healthcare professionals. The present invention includes one or more elements that enable access from, and delivery of content to, mobile computing devices 102, and mobile applications 104 and/or interfaces 106 configured with such mobile computing devices 102. Such mobile applications 104 and interfaces 106 may be accessed using any computer-based platform, such as for example on a desktop, laptop, or tablet computing device, or a mobile telephony device.

Figure 1:
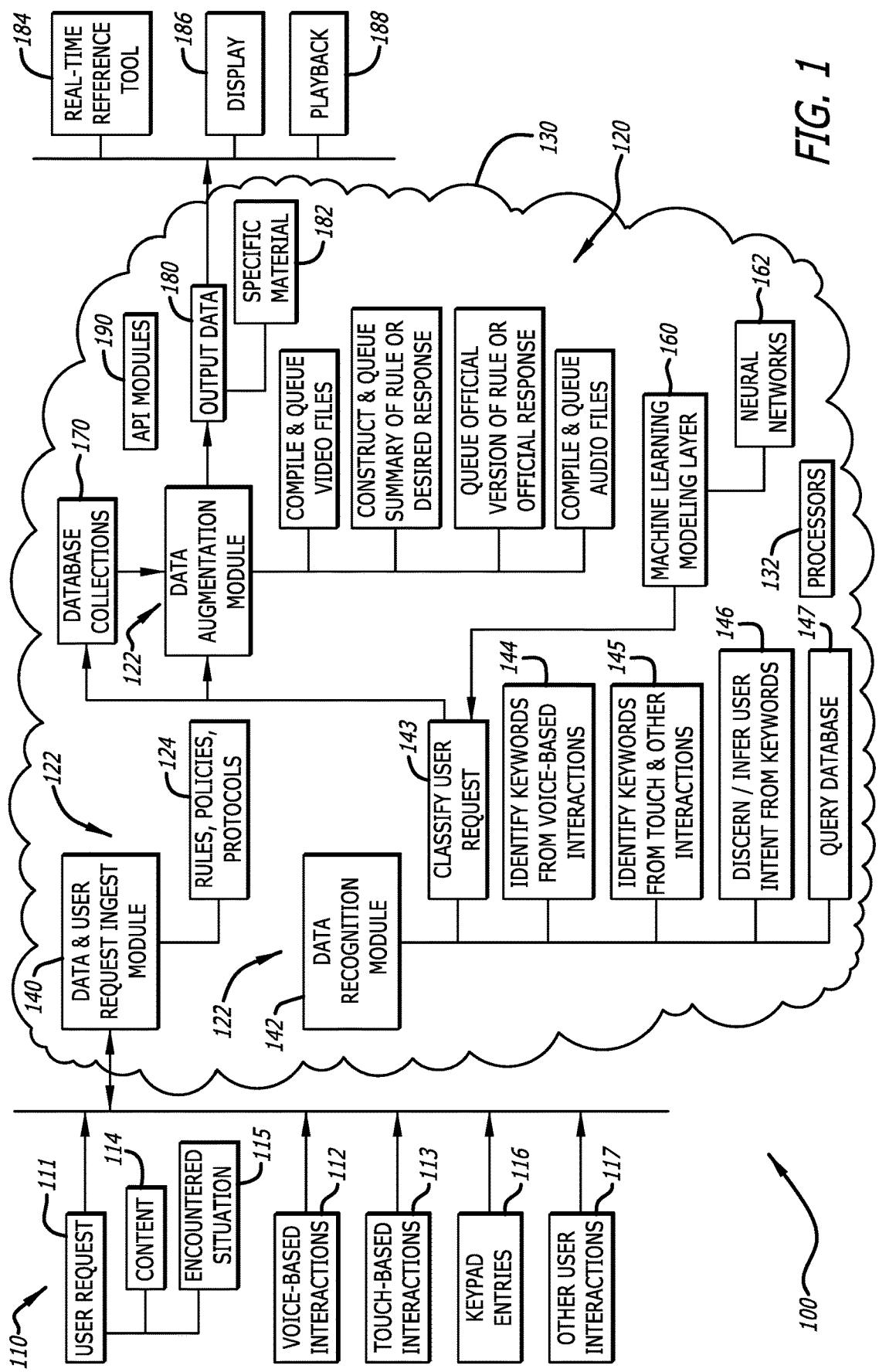
FIG. 1 is a system diagram illustrating elements of a data processing framework within a mobile computing platform and tool according to one embodiment of the present invention.

In one aspect thereof, the present invention includes a data processing framework 120 that receives input data 110 and analyzes, models, and processes such input data 110 to respond to user requests 111 embodied therein, and identify and respond to the content 114 and encountered situation 115 referenced in such a request 111. The data processing framework 120 enables, and responds to, user commands provided via user-initiated voice-based interactions 112 and/or user commands provided via user-initiated touch-based interactions 113, where such voice-based interactions 112 and/or touch-based interactions 113 are entered on such mobile applications 104 and interfaces 106, and processed for recognition of the user requests 111 and information contained therein. Such voice-based interactions 112 and/or touch-based interactions 113 therefore act as the input data 110, entered by or at the direction of users, and further represent a request for information that is an interpretation of a rule, policy, or protocol 124, or a response to an encountered situation 115, depending on the use case to which the present invention is applied. FIG. 1 is a system diagram illustrating elements of this mobile computing platform and tool 100, and the data processing framework 120 that is operable to perform the functions of such a mobile computing platform and tool 100 that are described herein.

The present invention therefore may include one or more mechanisms, modules, or algorithms configured to accept and ingest voice-based interactions 112 and touch-based interactions 113 between a user and an application 104 or interface 106 in a mobile computing environment. The present invention provides tools on such a mobile application 104 or interface 106 that are designed to allow users to quickly and easily enter such voice-based interactions 112 and touch-based interactions 113, for example an application that uses a microphone on a mobile computing device 102 to recognize a user's voice and commands therein. A voice command may be a single word or sound, and the touch command may be a tap or taps on the interface (for example on pre-defined areas thereof) or the press of a button or combination of buttons on such an interface and/or pre-defined areas thereof. Still other forms of command include entry of words on a keypad 116, or a shake or shakes of the mobile computing device itself. It is to be understood that many other forms of interactions 117 are possible, and therefore any other means of entry of commands may also be utilized, and are within the scope of the present invention. Examples of such other means of entry of commands include, but are not limited to, taking and sending photographs of situations.

Regardless, the input data 110 is applied and processing within, and the mobile computing platform and tool 100 is embodied within, one or more systems and/or methods that are performed in a plurality of data processing modules 122 that are components within a computing environment 130 that also includes one or more processors 132 and a plurality of software and hardware components. The one or more processors 132 and plurality of software and hardware components are configured to execute program instructions or routines to perform the modules, components, and data processing functions described herein, and embodied within the plurality of data processing modules 122.

Rules, policies, and protocols 124 or other relevant procedures may take many forms, and the data processing framework 120 may be configured to determine the particular rule, policy, or protocol 124 that is applicable in response to the one or more user-initiated voice-based interactions 112 and/or user-initiated touch-based interactions 113, based on different factors, such as keywords identified in the user request 111, the identity of the user, the mobile application 104 that is being used (for example, an identifier used therein), the location or positional coordinates of the mobile computing device 102 hosting that mobile application 104, surrounding environmental characteristics detected via the mobile computing device 102, or any combination thereof. For example, in a baseball setting, there are different sets of rules for different levels of baseball. At the professional level, Official Baseball Rules (OBR) apply, while at the same time there are different rules applicable for collegiate or NCAA baseball, and still different rules applicable for high school baseball as well as Little League baseball. The present invention is configured to discern not only the user intent from the one or more voice-based interactions 112 and/or touch-based interactions 113, but also discern the particular rule, policy or protocol 124 that is applicable based on one or more of the factors identified above.

The data processing framework 120 comprised of these data processing modules 130 may include a data and request ingest module 140, configured to identify input data 110 in the form of the one or more voice-based interactions 112 and/or touch-based interactions 113 representing the user request 111, and manage the process of identifying content 114 referenced therein and retrieving information in response to such input data 110 from one or more database collections 170 as described further herein. The data and request ingest module 140 of the data processing framework 120 receives the input data 110 within the mobile computing platform and tool 100, and initializes the information contained therein for classifying and processing the user request 111 for information relative to a rule(s), policy(ies), or protocol(s) 124.

The data processing framework 120, and data processing modules 122, may also include a data and request recognition module 142 configured to process the one or more voice-based interactions 112 or touch-based interactions 113 by determining the rule or situation 115 for which the user needs explanation, interpretation or support based on the command given. This process is performed by classifying 143 the user request 111 to discern 146 the user's intent when issuing commands from the one or more voice-based interactions 112 or touch-based interactions 113, and identify the content portion 114 needed in response to the user request 111. The classification 143 performed within the data recognition module 142 includes a speech-driven keyword identification process 144, in which speech in signals representing the voice-driven interactions captured by the mobile application 104 and mobile computing device 102 may be converted into file, for example an audio file (or transcribed and stored as a text file), and matched, associated or compared with known speech in existing audio files to identify keywords within the user's voice-based interactions 112.

Similarly, the data recognition module 142 includes a touch-driven keyword identification process 145, in which signals captured by the mobile application 104, and representing one or more pre-defined areas of the user interface 106 (for example, aligned with particular icons or widgets on the mobile application 104) is converted into a file, for example a text file, and matched, associated, or compared with existing text files to identify keywords intended by the touch-based interactions 113.

Together, these keywords identified in the voice-based interactions 112 or touch-based interactions 113 are analyzed to discern or infer 146 the user's intent. This occurs from associating, matching or comparing the identified keywords with known keywords representing the information regarding the rule, policy, or protocol 124 being requested, and the field in which the rule, policy, or protocol 124 is applicable. One or more algorithms configured to perform statistical probabilities, ascertain confidence intervals, or determine relevance from processed data may be applied in the data recognition module 144 to perform this associating, matching or comparing the identified keywords with known keywords, and determine whether the information contained in the voice-based interactions 112 or touch-based interactions 113 is enough to infer 146 the user's intent. Such algorithms, which may include techniques of artificial intelligence and machine learning applied in the data processing framework 120, may be utilized in association with the machine learning modeling layer 160 described further below.

For example, a relevance algorithm may be applied to determine if a set of keywords belong to a certain category or categories that correlate the user's interactions with particular content, so as to match, associate, or compare keywords (or keyword pairings) with known keywords relative to particular rules, policies, or protocols. The relevance algorithm may, prior to its application, be trained and optimized for accuracy to ensure that keywords and keyword pairings are appropriate for a particular encountered situation 115. Training of the relevance algorithm is based on a set of training documents or files, and optimization of the relevance algorithm is based on a set of testing documents. Each document or file in a training set is attributed to the certain situation, either manually or automatically, and many machine-learning techniques for utilizing the training set to train the relevance algorithm may be used, including for example random forest, stochastic gradient, decision tree, naïve Bayes, boosting-based neural network (such as AdaBoost), and combinations thereof.

The data recognition module 142 may further be configured to link the files, and keywords, generated from the voice-based interactions 112 and touch-based interactions 113, with one or more additional modules for delivering specific material 182 in response thereto as output data 180. When the intent inferred from the voice-based interactions 112 and the touch-based interactions 113 provided by the user are recognized and identified, the data processing framework 120 then identifies one or more specific database collection relating to content based on the inferred user intent, and queries 147 the specific database collection(s) to identify content therein that can be used for the specific material 182 relative to the encountered situation 115 that is responsive to the user request 111. The data processing framework 120 then begins to model an appropriate response to the requests for information contained in those voice-based interactions 112 and touch-based interactions 113, in a data augmentation module 150.

The response is an action generated to deliver content to the mobile computing device 104 of the user as output data 180, and the data augmentation module 150 may be configured to arrange the content provided in the specific material 182 in a plurality of different formats. It is to be noted that content delivery may occur in a single format, or as a collection of material in different formats. Additionally, it is to be noted that these formats may be pre-designated by the user or by the application over which voice-based interactions 112 or touch-based interactions 113 are issued, or automatically selected or manually selected by the user in real-time, for example depending on the encountered situation 115 in which such material is needed.

The data augmentation module 150 may configure the content provided as specific material in response to requests for information in the user's voice interactions 112 or touch interactions 113 as one or more video files 152 to the mobile application 104 and/or mobile computing device 102. This may occur via a dedicated or hosted video platform, or directly via the application 104 or interface 106 being used by the user. Therefore, the data augmentation module 150 may be configured to access, obtain, compile, or otherwise generate a video file 152 that presents the material to the user, and queue that video file 152 for display 186 in a reference tool 184 that is representative of the output data 180 (and playback 188 of the video file 152). These video files 152 may include recorded situational footage (in the context of sports officiating, a particular play or situation in a game or contest), freeze frame points-of-emphasis, and staged situations using full-speed and slow-motion video. Video files 152 may be provided together with auditory and textual association, either at the selection of the user or automatically, for example where as noted below the present invention detects a poor Internet or Wi-Fi connection for streaming a video file 152.

The specific material generated by the data augmentation module 150 may also include one or more of a summarization or lay explanation 154 representing the desired interpretation of the rule, policy, or protocol 124, or the desired response to the encountered situation 115, and therefore the data processing framework 120 of the present invention may be configured to construct and queue such a summarization or lay explanation 152, again for display 186 in a reference tool 184 that is representative of the output data 180. The augmentation module 150 may be further configured to present the specific material 182 as an official version of the rule being interpreted, or an official response to the situation 156, and this may occur in different formats, such as a video file, an audio file, or a text file. The data augmentation module 150 may therefore also be configured to retrieve, generate, and queue such an official version of the rule being interpreted, or an official response to the situation 156.

The specific material 182 provided in response to the user request 111 for information may also be provided as one or more audio files 158 delivered to the mobile computing device 102 or mobile application 104. As above, the data augmentation module 150 of the present invention may thus be configured to access, obtain, compile, or otherwise generate an audio file 158, again within in a reference tool 184 that is representative of the output data 180 (and playback 188 of the audio file 158). The audio file(s) 158 is also delivered to the user via the mobile application 104 or interface 106 on the mobile computing device 102.

Many other delivery formats for such specific material 182 and output data 180 are possible, and are within the scope of the present invention. For example, output data 180 may be provided as one or more animations, or as a steady stream of information, either in real-time or at specific temporal intervals. Regardless of the format, is to be understood that the present invention also includes software-based tools for seamlessly integrating various formats and applications that are used to deliver the material in response to requests for information. Additionally, the specific materials 182 generated in response to a user's request(s) 111 for information may be configured for consumption by the user (for example, display or playback) using specific aspects of the mobile computing device 102, and the seamless integration of various formats and applications of the mobile computing device 102 enables a consumption that is specific to the user's particular device 102 or the characteristics of the user himself or herself.

The data processing framework 120 of the present invention may also further augment the material 182 generated and provided in response to user requests 111 for information by detecting one or more characteristics of the display environment of the mobile computing device 102, for example to determine if the surroundings would affect the format or type of delivery, or if the user's mobile computing device 102 has enhancements or limitations which enable or hinder delivery and consumption of the material. For example, the present invention may detect a poor Internet connection as noted above, and convert a video file 152 into an audio file 158 to ensure that the material 182 is delivered and used as expected by the user.

The present invention may also include, as noted above, one or more database collections 170 created for storing and managing content or material to be provided to the user's voice-based or touch-based commands. Storing and accessing information in the one or more database collections 170 may be managed within an administration component of the data processing framework 120 that enables files and information stored therein to be located and retrieved in response to the processing input data 110. The one or more database collections 170 may maintain information the video files, audio files, and textual files for the rules summaries and lay explanations, and the actual rules themselves, in either online or offline storage environments, or may contain pointers to such information for easy retrieval.

The one or more database collections 170 may include any type of database structure, for example a relational database structure in which data is arranged and organized into one or more tables, relations, of columns and rows, and where a unique key identifies each row. Such a relational database may utilize one or more "languages" for querying and maintaining the database, such as structured query language (SQL) and the like. The data processing framework 120 of the present invention may be configured to convert the classified user request based on the one or more keywords identified as described above into SQL or other similar format for querying the one or more database collections 170 and retrieving the desired content stored therein.

It is to be understood that materials 182 may be delivered in multiple formats as noted above, and also in any order, again either at the selection of the user, depending on the availability of the materials 182, or automatically. The present invention may also "suggest" the order in which materials 182 are delivered. This may also occur automatically, for example depending on the characteristics of the display environment or the mobile computing device 102 detected.

The mobile computing platform and tool 100 of the present invention may also enable one or more specific application programming interface (API) modules 190 to provide particular information or services and generate specific outcomes in response to voice-based interactions 112 or touch-based interactions 113, or the encountered situation 115 for which a response to a user request 111 is needed. APIs 190 may be tailored to provide specific services or information, such as generating an advisory or warning from an official agency (for example, in a situation where the user voices or touches a command for support where video replay is being used, the user may receive a specific response from an advisory body or agency responsible for providing the video replay in response to a user request 111 for information. APIs 190 may also be used to provide additional material to supplement rules, policies, and protocols 124, for example to automatically update rules or code as such rules or code are made available by their respective certifying or issuing authority, and store such additional material in the relevant database collection(s) 170 for that particular subject or field. It is to be understood that many types of services are possible within the present invention, and it is not to be limited to any one type of service mentioned herein.

The present invention may also include or access a machine learning modeling layer 160 that is configured to perform various functions within the data processing framework 120 of the mobile computing platform and tool 100. These may include modeling the voice-based interactions 112 and touch-based interactions 113 to process the information contained therein and identify keywords, performing one or more analyses on keywords to ascertain the user's intent, and augmenting the specific content to generate specific material for delivery to the user. The machine learning modeling layer 160 may be comprised of one or more neural networks 162 that further evaluate input data 110, such as for example audio files generated from voice-based interactions 112, to perform the specific algorithms (and increase their accuracy) attendant to discerning the user's commands and intentions using a mobile application 104 and/or a mobile computing device 102. The present invention therefore contemplates that one or more techniques of artificial intelligence may be applied to the data processing framework 120 and the mathematical functions performed therein, and may themselves constitute data processing and mathematical functions performed within the mobile computing platform and tool 100.

Such a machine learning modeling layer 160 may also be configured to generate customized information based on how the user has perceived the material presented to that point, or based on specific voice commands that the user has devised for requesting information in the past. The present invention, may, by further example, be configured to speed up or slow down video or audio files generated, based on feedback it receives as the content being consumed. The machine learning modeling layer 160 may further determine the rule or situation for which the user needs explanation or interpretation based on the command given, for example by learning from previous issuances of voice commands. The machine learning modeling layer 160 may also be used as noted above to "suggest" the order in which to present material 182, and to learn how to detect environmental characteristics, such as from ambient sound, in order to improve the delivery of materials, such as for example by automatically increasing or decreasing the volume of speakers used on a mobile computing device 102.

Neural networks generally are comprised of nodes, which are computational units having one or more biased input/output connections, which are transfer (or activation) functions that combine the inputs in some way, and an output connection. Nodes are then organized into layers that form a neural network. There are many types of neural networks, which are computing systems that "learn" to perform tasks without being programmed with task-specific rules, based on examples. Neural networks generally are based on arrays of connected, aggregated nodes (or, "neurons") that transmit signals to each other in multiple layers over connections. Connections as noted above are activation or transfer functions that "fire" these nodes and combine inputs according to mathematical equations or formulas. Different types of neural networks generally have different configurations of these layers of connected, aggregated nodes, but they can generally be described as an input layer, a middle or 'hidden' layer, and an output layer. These layers may perform different transformations on their various inputs, using different mathematical calculations or functions. Signals travel between these layers, from the input layer to the output layer via the middle layer, and may traverse layers, and nodes, multiple times.

Signals are transmitted between nodes over connections, and the output of each node is calculated in a non-linear function that sums all of the inputs to that node. Weight matrices and biases are typically applied to each node, and each connection, and these weights and biases are adjusted as the neural network processes inputs and transmits them across the nodes and connections. These weights represent increases or decreases in the strength of a signal at a particular connection. Additionally, nodes may have a threshold, such that a signal is sent only if the aggregated output at that node crosses that threshold. Weights generally represent how long an activation function takes, while biases represent when, in time, such a function starts; together, they help gradients minimize over time. At least in the case of weights, they can be initialized and change (i.e. decay) over time, as a system learns what weights should be, and how they should be adjusted. In other words, neural networks evolve as they learn, and the mathematical formulas and functions that comprise neural networks design can change over time as a system improves itself.

Neural networks 162 may be applicable in the data processing framework 120 of the mobile computing platform and tool 100, particular where classification resulting from analysis of voice-based interactions 112 is needed. For example, a neural network 162 trained on different user's voices, spoken in different accents, and at different speeds, may improve the resulting processing required to correctly ascertain keywords (or keyword pairings) and match, associate or compare those keywords and pairings with existing categories to quickly determine the user's intent and compile a response to user requests 111. This may be particularly important where the user's commands are issued in time-sensitive encountered situations, requiring a fast and accurate response.

Figure 2:
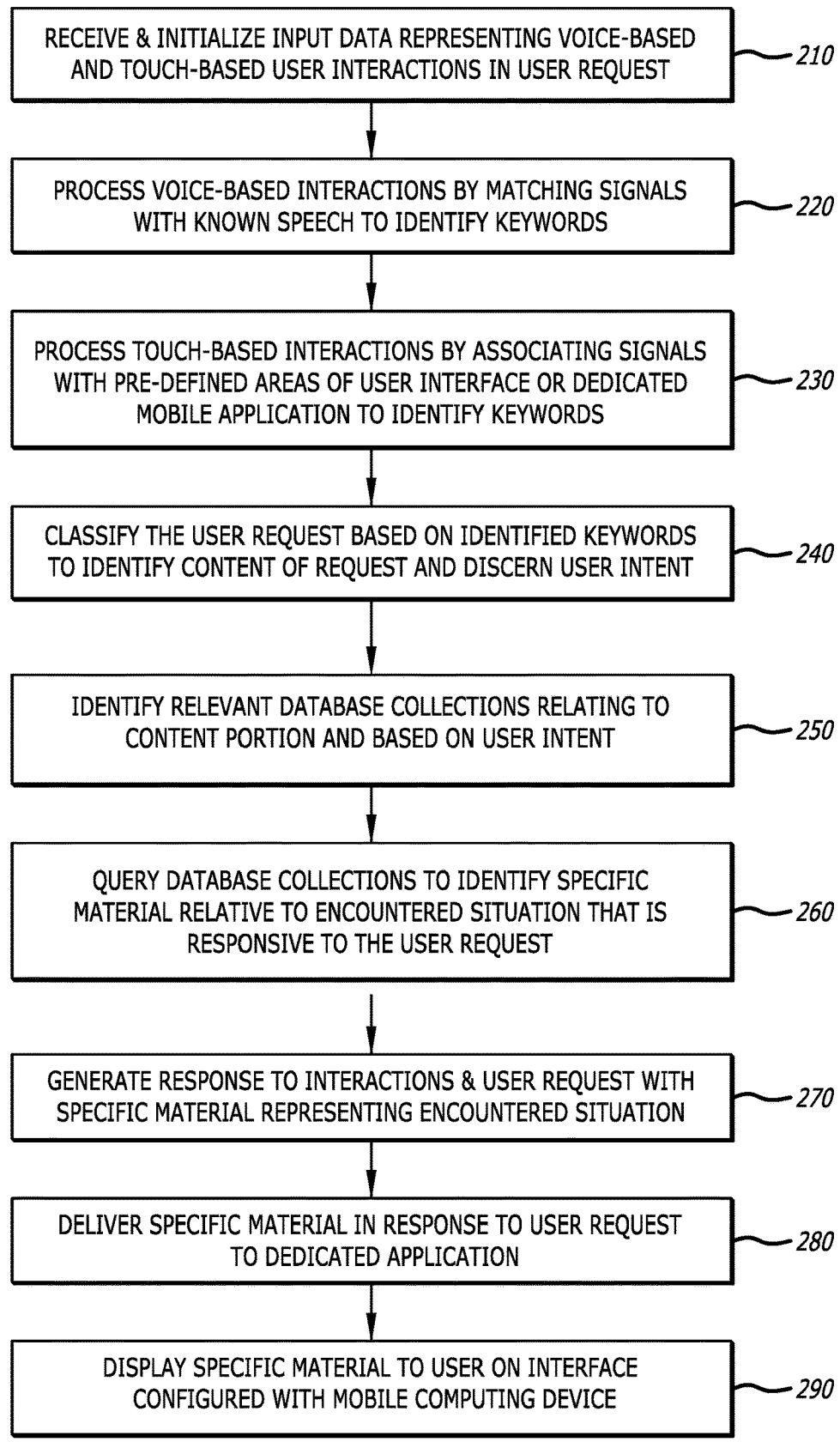
FIG. 2 is a flowchart of steps in a process of performing data processing within the data processing framework and the mobile computing platform and tool according to the present invention.

FIG. 2 is a flowchart of steps in an exemplary process 200 of performing data processing within the data processing framework 120 and the mobile computing platform and tool 100. Such a process 200 begins at step 210, with the mobile computing platform and tool 100 receiving and initializing input data 110 in the form of user-initiated voice-based interactions 112, user-initiated touch-based interactions 113, and other form user-initiated interaction via a user interface 106 on a mobile application 104 and/or a mobile computing device 102. These user-initiated interactions are all indicative of a user request 111 for information in response to, or for, an encountered situation 115, regardless of whether the encountered situation. 115 is related to training for such a situation, or one actually encountered by the user.

At steps 220 and 230, the process 200 analyzes the user-initiated voice-based interactions 112 and the user-initiated touch-based interactions 113. The process 200 matches signals derived from the voice-based interactions 112 with known speech, or data from previously-identified speech, in one or more audio files, to identify keywords or keyword pairings in voice commands issued by the user. Similarly, the process 200 associates signals derived from touch-based interactions 113 and associated with pre-defined areas of an application 104 or interface 106, to identify keywords or keyword pairings in touch commands 113 issued by the user.

The identified keywords and keyword pairings in steps 220 and 230 are used to classify the user request 111 to identify a content portion 114 of the request ill, and discern a user intent from the voice-based interactions 112 and touch-based interactions 113 at step 240. At step 250, the classified user request 111 representative of a discerned user intent is used to identify relevant database collections 170 that are relative to the content portion, and in which specific material relative to rules, policies, and protocols 124 for the content portion are maintained and stored.

At step 260, identified database collections 170 are queried to identify content therein that is relative to an encountered situation 115, that is responsive to the classified user request ill. At step 270, a response to the user request 111 is generated based on specific material 182 identified that represents the encountered situation 115. Specific material 182 may be augmented by the data augmentation module 150, based on one or more parameters or characteristics that relate to the encountered situation 115, the user request 111 itself, or any other aspect of the user request 111, such as for example the field of the request or the mobile computing device 102 being used. At step 280, this specific material 182 is delivered in response to the user request 111 to the mobile application 104 of the user, or the mobile computing device 102. At step 290, the specific material 182 is displayed to the user in a reference tool 184 via an interface 106 configured with the mobile application 104 of the user, and the mobile computing device 102.

As noted above, in one embodiment of the present invention, the mobile computing platform and tool 100, and data processing framework 120 therein, is applicable in the field of training of officials in sports, such as umpires in baseball. However, many other embodiments are contemplated and possible, and within the scope of the present invention, and such embodiments are applicable in both training scenarios as well as in "real life" scenarios, where the encountered situation is an actual event being experienced and requiring application of rules, policies, and protocols 124 or other procedures. For example, the present invention is applicable for training and assisting in the fields of law enforcement, military, law, medicine, and education, among many others. In the field of education, the present invention may be used to assist educators in applying the correct education code section when assessing a whether to introduce a particular a program or policy, and how to apply that program or policy. Whether for training or for actual applying the correct education section, a user initiates voice-based interactions 112 and/or touch-based interactions 113 via an interface 106 using a mobile application 104 or mobile computing device 102 to access the correct education code section they are seeking for the particular program or policy. The data processing framework 120 is therefore configured to classify the user request 111 embodied therein, and deliver the appropriate specific material 182 that is responsive thereto.

In a further example, electricians (whether training for certification, or in actual situations) often need access to code or regulations when performing a job such as installing or repairing electrical equipment. The present invention may be used to assist professionals in applying the correct electrical code on a job site or when obtaining certification. Whether for training or for actual applying the correct code, a user initiates voice-based interactions 112 and/or touch-based interactions 113 via an interface 106 using a mobile application 104 or mobile computing device 102 to access the correct material they are seeking. The data processing framework 120 is therefore configured to classify the user request 111 embodied therein, and deliver the appropriate specific material 182 that is responsive thereto.

The systems and methods of the present invention may be implemented in many different computing environments 130. For example, the present invention may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. For example, the present invention may be applied to any situational training and content where such techniques would be beneficial, and to any field. Many examples are possible, and include law enforcement, military, or security training, flight training for pilots or air crew, and training for medical professionals such as emergency/first responders. It is therefore intended that the scope of the invention is not to be limited by any one aspect of this detailed description, or to any one field, profession, or situation.

Additionally, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:
receiving, as input data, one or more user-initiated voice-based and touch-based interactions with an interface configured with a mobile computing device, the one or more user-initiated voice-based and touch-based interactions representing a user request for information relating to an interpretation of a rule, policy, or protocol in response to an encountered situation, the user request initiated using a dedicated application configured with the interface on the mobile computing device;
analyzing the one or more voice-based and touch-based interactions, to recognize the user request for delivery of content in response to the user request and link the user request with the content that is relative to the encountered situation, by:
classifying the user request from the one or more user-initiated voice-based and touch-based interactions in a machine learning layer to determine a user intent, the machine learning layer modeling at least one signal generated following the one or more user-initiated voice-based and touch-based interactions to identify keywords that discern the user intent to identify a content portion, wherein the machine learning layer applies a relevance algorithm to determine if the keywords belong to at least one category that correlates the one or more user-initiated voice-based and touch-based interactions with particular content, and associate the keywords with known keywords relative to particular rules, policies, or protocols, and further applies one or more neural network models in which weights are assigned to the keywords associated with the known keywords from the relevance algorithm, the one or more neural network models performing at least one of matching voice signals generated in response to a voice interaction with signals representing known speech patterns to identify specific keywords in the voice-based interactions, and associating the touch-based interactions with signals representing one or more predefined areas of the user interface to identify specific keywords indicated in the touch-based interactions that indicate the user intent,
identifying a specific database collection relating to the content portion and based on the user intent indicated from the machine learning layer, and querying the specific database collection to identify specific material relative to the encountered situation that is responsive to the user request;
generating, as output data, a response to the one or more voice-based and touch-based interactions, by
queueing at least one audio or video file in the specific material to the mobile computing device,
constructing one or more of a summarization representing a desired interpretation of the rule, policy or protocol or a desired response to the situation from the specific material in response to the user intent, and
queuing one or both of an official version of the rule, policy or protocol being interpreted, or an official response to the situation, from the specific material; and
displaying, simultaneously, as a real-time reference tool for a user, the at least one audio or video file, the summarization, and the one or both of the official version and the official response on an interface of the mobile computing device.

2. The method of claim 1, wherein the encountered situation is a training situation where the user is training to apply the rule, policy or protocol.

3. The method of claim 1, wherein the encountered situation requires a response to an actual situation involving an application of the rule, policy, or protocol.

4. The method of claim 1, wherein the encountered situation is a sports referee training situation.

5. The method of claim 1, wherein the input data includes user interactions in the form of words generated by the user using a keypad associated within one or more of the dedicated application or the mobile computing device.

6. The method of claim 1, wherein the specific database collection in which the specific material is maintained is one or more relational databases, and wherein the querying involves converting the user request into a structured query to retrieve the specific material.

7. The method of claim 1, wherein the classifying the user request from the one or more user-initiated voice-based and touch-based interactions further comprises applying a probability analysis to determine a relevance for the user intent.

8. A system, comprising:
within a computing environment comprised of at least one computer processor, and at least one non-transitory computer-readable storage medium operably coupled to the at least one computer processor and storing instructions which, when executed by the at least one computer processor, cause the at least one processor to initiate a custom content management tool that is responsive to one or more user-initiated voice-based and touch-based interactions with an interface configured with a mobile computing device, the custom content management tool including:
a dedicated application configured with the interface on the mobile computing device, the dedicated application further configured to receive the one or more user-initiated voice-based and touch-based interactions, the one or more user-initiated voice-based and touch-based interactions representing a user request for information relating to an interpretation of a rule, policy, or protocol in response to an encountered situation, the user request initiated using the dedicated application configured with the interface on the mobile computing device;
a recognition module comprising a machine learning layer that is configured to recognize the user request for delivery of content in response to the user request and link the user request with the content that is relative to the encountered situation, by classifying the user request from the one or more user-initiated voice-based and touch-based interactions to determine a user intent, the machine learning layer modeling at least one signal generated following the one or more user-initiated voice-based and touch-based interactions to identify keywords that discern the user intent to identify a content portion, wherein the machine learning layer applies a relevance algorithm to determine if the keywords belong to at least one category that correlates the one or more user-initiated voice-based and touch-based interactions with particular content, and associate the keywords with known keywords relative to particular rules, policies, or protocols, and further applies one or more neural network models in which weights are assigned to the keywords associated with the known keywords from the relevance algorithm, the one or more neural network models performing at least one of matching voice signals generated in response to a voice interaction with signals representing known speech patterns to identify specific keywords in the voice-based interactions, and associating the touch-based interactions with signals representing one or more pre-defined areas of the user interface to identify specific keywords indicated in the touch-based interactions that indicate the user intent, and identifying a specific database collection relating to the content portion and based on the user intent indicated from the machine learning layer, and querying the specific database collection to identify specific material relative to the encountered situation that is responsive to the user request;
a data augmentation module configured to prepare a response to the one or more voice-based and touch-based interactions, by queueing at least one audio or video file in the specific material to the mobile computing device, constructing one or more of a summarization representing a desired interpretation of the rule, policy or protocol or a desired response to the situation from the specific material in response to the user intent, and queuing one or both of an official version of the rule, policy or protocol being interpreted, or an official response to the situation, from the specific material;
a content delivery module configured to deliver the at least one audio or video file, the summarization, and the one or both of the official version and the official response to a dedicated application configured with the interface on the mobile computing device; and
a visualization module configured to simultaneously display, as a real-time reference for a user, the at least one audio or video file, the summarization, and the one or both of the official version and the official response on the dedicated application configured with the interface on the mobile computing device.

9. The system of claim 8, wherein the encountered situation is a training situation where the user is training to apply the rule, policy or protocol.

10. The system of claim 8, wherein the encountered situation requires a response to an actual situation involving an application of the rule, policy, or protocol.

11. The system of claim 8, wherein the encountered situation is a sports referee training situation.

12. The system of claim 8, wherein the one or more user-initiated voice-based and touch-based interactions with an interface includes user interactions in the form of words generated by the user using a keypad associated within one or more of the dedicated application or the mobile computing device.

13. The system of claim 8, wherein the specific database collection in which the specific material is maintained is one or more relational databases, and wherein the querying involves converting the user request into a structured query to retrieve the specific material.

14. The system of claim 8, wherein the data recognition module is further configured to apply a probability analysis to determine a relevance for the user intent for classifying the user request from the one or more user-initiated voice-based and touch-based interactions.

15. A method, comprising:
within a computing environment comprised of at least one computer processor, and at least one non-transitory computer-readable storage medium operably coupled to the at least one computer processor and storing instructions which, when executed by the at least one computer processor, cause the at least one processor to analyze one or more voice-based and touch-based interactions with an interface configured with a mobile computing device, the one or more user-initiated voice-based and touch-based interactions representing a user request for information relating to an interpretation of a rule, policy, or protocol in response to an encountered situation, within a plurality of data processing modules, the plurality of data processing modules configured to recognize the user request for delivery of content in response to the user request and link the user request with the content that is relative to the encountered situation, by:

identifying keywords indicative of a user intent to identify a content portion from the one or more voice-based and touch-based interactions in a machine learning layer, the machine learning layer modeling at least one signal generated following the one or more user-initiated voice-based and touch-based interactions to identify keywords that discern the user intent to identify a content portion, wherein the machine learning layer applies a relevance algorithm to determine if the keywords belong to at least one category that correlates the one or more user-initiated voice-based and touch-based interactions with particular content, and associate the keywords with known keywords relative to particular rules, policies, or protocols, and further applies one or more neural network models in which weights are assigned to the keywords associated with the known keywords from the relevance algorithm, the one or more neural network models performing at least one of matching voice signals generated in response to a voice interaction with signals representing known speech patterns to identify specific keywords in the voice-based interactions, and associating the touch-based interactions with signals representing one or more pre-defined areas of the user interface to identify specific keywords indicated in the touch-based interactions that indicate the user intent;

classifying the user request based on the keywords that discern the user intent, and identifying one or more specific database collections relating to the content portion and based on the user intent indicated from the machine learning layer;

identifying specific material relative to the encountered situation that is responsive to the user request, by querying the specific database collections for the specific material;

responding to the one or more voice-based and touch-based interactions with the specific material, by queueing at least one audio or video file in the specific material to the mobile computing device, constructing one or more of a summarization representing a desired interpretation of the rule, policy or protocol or a desired response to the situation from the specific material in response to the user intent, and queuing one or both of an official version of the rule, policy or protocol being interpreted, or an official response to the situation, from the specific material; and delivering the at least one audio or video file, the summarization, and the one or both of the official version and the official response to a dedicated application configured with the interface on the mobile computing device, and displaying simultaneously, as a real-time reference tool for a user, the at least one audio or video file, the summarization, and the one or both of the official version and the official response on the dedicated application configured with the interface on the mobile computing device.

16. The method of claim 15, wherein the user request is initiated using the dedicated application configured with the interface on the mobile computing device.

17. The method of claim 15, wherein the encountered situation is a training situation where the user is training to apply the rule, policy or protocol.

18. The method of claim 15, wherein the encountered situation requires a response to an actual situation involving an application of the rule, policy, or protocol.

19. The method of claim 15, wherein the encountered situation is a sports referee training situation.

20. The method of claim 15, wherein the one or more user-initiated voice-based and touch-based interactions with an interface includes user interactions in the form of words generated by the user using a keypad associated within one or more of the dedicated application or the mobile computing device.

21. The method of claim 15, wherein the specific database collection in which the specific material is maintained is one or more relational databases, and wherein the querying involves converting the user request into a structured query to retrieve the specific material.

22. The method of claim 15, wherein the classifying the user request based on the keywords that discern the user intent further comprises applying a probability analysis to determine a relevance for the user intent.

* * * * *